US006589660B1

(12) United States Patent
Templeton et al.

(10) Patent No.: US 6,589,660 B1
(45) Date of Patent: Jul. 8, 2003

(54) WEATHERABLE BUILDING MATERIALS

(75) Inventors: G. Daniel Templeton, Fort Wayne, IN (US); Ronald C. Minke, Fort Wayne, IN (US); Cem A. Porter, Garrett, IN (US); Kenneth J. West, Grabill, IN (US)

(73) Assignee: TT Technologies, Inc., Mauinee, OH (US)

( * ) Notice: Subject to any disclaimer, the term of this patent is extended or adjusted under 35 U.S.C. 154(b) by 0 days.

(21) Appl. No.: 09/355,209

(22) PCT Filed: Aug. 14, 1997

(86) PCT No.: PCT/US97/14290

§ 371 (c)(1),
(2), (4) Date: Jul. 23, 1999

(87) PCT Pub. No.: WO98/32600

PCT Pub. Date: Jul. 30, 1998

(51) Int. Cl.[7] .................... B32B 21/02; B32B 21/08; B32B 27/42; D04H 1/64

(52) U.S. Cl. .................... 428/452; 264/124; 264/128; 428/506; 428/514; 428/529; 428/537.1; 524/14

(58) Field of Search .................... 264/124, 128; 428/452, 506, 514, 529, 537.1; 524/14

(56) References Cited

U.S. PATENT DOCUMENTS

| | | | | |
|---|---|---|---|---|
| 1,593,342 | A | 7/1926 | Meigs | 527/303 |
| 1,868,216 | A | 7/1932 | Meigs | 527/303 |
| 2,553,512 | A | 5/1951 | Cotton, Jr. | 55/306 |
| 2,706,160 | A | 4/1955 | Glab | 106/164.53 |
| 2,714,072 | A | 7/1955 | Roberts | 106/164.41 |
| 2,757,115 | A | 7/1956 | Heritage | 428/338 |
| 2,759,837 | A | 8/1956 | Roberts | 162/13 |
| 2,872,337 | A | 2/1959 | Heritage et al. | 428/499 |
| 3,252,815 | A | 5/1966 | Glab | 264/165.01 |
| 3,280,237 | A | 10/1966 | Corbin et al. | 264/109 |
| 3,668,286 | A | 6/1972 | Brooks et al. | 264/451 |
| 3,696,082 | A | 10/1972 | Smith | |
| 3,714,097 | A | 1/1973 | Cautilli et al. | |
| 3,883,455 | A | 5/1975 | Peos | 106/263 X |
| 3,935,151 | A | 1/1976 | Nickerson et al. | 428/483 |
| 3,996,177 | A | 12/1976 | Ludwig | |
| 4,082,903 | A | 4/1978 | Chow | 428/514 |
| 4,128,519 | A | 12/1978 | Bartoszek et al. | |
| 4,136,207 | A | 1/1979 | Bender | 426/510 |
| 4,175,148 | A | 11/1979 | Luck et al. | 428/171 |
| 4,201,802 | A | 5/1980 | Vande Kieft | 427/370 |
| 4,283,450 | A | 8/1981 | Luck et al. | 428/171 |
| 4,305,989 | A | 12/1981 | Luck et al. | 428/171 |
| 4,336,174 | A | 6/1982 | Sanfilippo et al. | 524/512 |
| 4,374,899 | A | 2/1983 | Sanfilippo et al. | 428/514 |
| 4,433,126 | A | 2/1984 | Hsu et al. | 527/105 |
| 4,474,846 | A | 10/1984 | Doerer et al. | 428/284 |
| 4,479,912 | A | 10/1984 | Bullock | 264/23 |
| 4,517,147 | A | 5/1985 | Taylor et al. | 264/83 |
| 4,521,495 | A | 6/1985 | Hahn, Jr. | 428/537.1 |
| 4,539,252 | A | 9/1985 | Franz | 428/218 |
| 4,580,383 | A | 4/1986 | Pittman et al. | 52/520 |
| 4,592,186 | A | 6/1986 | Braginetz | 52/699 |
| 4,610,119 | A | 9/1986 | Bench, Sr. | 52/309.3 |
| 4,627,999 | A | 12/1986 | Hsu | 428/326 |
| 4,786,547 | A | 11/1988 | St-Michel | 428/215 |
| 4,788,808 | A | 12/1988 | Slocum | 52/521 |
| 4,852,314 | A | 8/1989 | Moore, Jr. | 52/199 |
| 4,913,972 | A | 4/1990 | Grunewalder et al. | 428/425.5 |
| 5,017,319 | A | 5/1991 | Shen | 264/124 |
| 5,028,286 | A | 7/1991 | Hsu | 156/62.4 |
| 5,035,944 | A | 7/1991 | Frazza et al. | 428/312.4 |
| 5,134,023 | A | 7/1992 | Hsu | 428/288 |
| 5,135,793 | A | 8/1992 | Socha | 428/74 |
| 5,182,313 | A | 1/1993 | Carson | 521/155 |
| 5,194,307 | A | 3/1993 | Gardeski | 428/40 |
| 5,286,778 | A | 2/1994 | Dean et al. | 524/460 |
| 5,344,867 | A | 9/1994 | Morgan et al. | 524/460 |
| 5,354,832 | A | 10/1994 | Chang et al. | 528/10 |
| 5,395,436 | A | 3/1995 | Setzke | 106/34 |
| 5,413,867 | A | 5/1995 | Chang et al. | 428/447 |
| 5,537,789 | A | 7/1996 | Minke et al. | 52/313 |

FOREIGN PATENT DOCUMENTS

| | | |
|---|---|---|
| EP | 0 595 462 | 9/1993 |
| GB | 1 558 411 | 12/1976 |
| WO | WO 92 128 36 | 1/1992 |

*Primary Examiner*—D. S. Nakarani
(74) *Attorney, Agent, or Firm*—Brooks & Kushman P.C.

(57) ABSTRACT

Weatherable building materials particularly well suited for entry door skins and other exterior building components are prepared by compression molding lignocellulosic fibers digested under conditions such that partial breakdown of hemicellulosic and other components produces an in situ binder, together with a secondary phenol/formaldehyde binder resin, followed by impregnating the product with a non-fugitive tertiary binder.

26 Claims, No Drawings

WEATHERABLE BUILDING MATERIALS

CROSS-REFERENCE TO RELATED APPLICATION

This application is the U.S. national phase of PCT application No. PCT/US97/14290, filed Aug. 14, 1997, which further claims priority to U.S. patent application Ser. No. 08/791,023, filed Jan. 27, 1997 now abandoned.

TECHNOLOGICAL FIELD

The present invention pertains to weatherable building materials prepared from lignocellulosic fibers. More particularly, the subject invention pertains to door systems capable of withstanding conditions to which outside entry doors are exposed.

BACKGROUND

In former times, entry doors were constructed of seasoned or kiln dried wood. Wooden doors are strong and relatively durable. However, their manufacture is relatively expensive due to numerous manual operations as well as the time required to allow adhesives to harden and/or cure during construction. Moreover, as wood is a natural product and susceptible to wide variation in makeup, grain patterns, density and the like, doors often exhibit warping, twisting, or bowing. Exterior wood products exposed to moisture exhibit a tendency to rot. With respect to insulation value, wood leaves much to be desired. Finally, high quality lumber suitable for manufacturing doors, jambs, thresholds, and other entry door system components, is becoming increasingly scarce and expensive. Finger-jointed door jambs and the like have become common for this reason. However, while such components are suitable for painting, the finger joints make them unsuitable for staining and/or varnishing.

Some of the previously identified drawbacks were overcome by the introduction of metal doors of sandwich construction. Such doors generally have a surrounding frame of wood or compressed wood product, and an insulating foam core onto which are joined metal skins. Such doors are less expensive to manufacture, are better insulators, and are highly rot resistant. Unfortunately, the difference in temperature between the inner and outer skins in cold weather coupled with a relatively high coefficient of thermal expansion of the metal can produce a temporary bowing rendering the door difficult to close. More importantly, such doors are susceptible to denting and rusting. Aesthetics of metal doors, even when painted, are less than desirable.

Interior door systems have been made of a variety of compressed wood products. Such doors often have outer skins of compression molded wood fibers or flours with or without interior foam insulation, and structural members of wood or particle board. Wood fibers, chips, and similar starting materials are inexpensive and easily processed on a large scale. Phenol/formaldehyde resol resins or similar resins of urea/formaldehyde, melamine/formaldehyde, and the like are generally used as binders in these systems. However, such doors are incapable of withstanding exterior conditions, and often are unsuitable even for interior locations where humidity extremes are encountered, i.e. basements, bathrooms, and the like.

Manufacture of weatherable building materials from compression molded wood products has not met with a great deal of success. Such products can absorb large amounts of water, plasticizing the fibers and decreasing strength and modulus. When heated by the sun, the water contained in such materials may cause both the product interior as well as surface layers and/or coatings to blister, peel, or delaminate. Coating such components with water impermeable coatings such as coatings of melamine resins, decreases water penetration. However, water may still enter through coating imperfections, cracks, scratches, or through openings necessary for mounting of hardware, i.e. lock sets, door knobs, deadbolts, hinges, and the like. No commercial products in this category have met the accelerated ageing test as more fully defined hereafter.

A recent high density fiberboard exterior door product is believed to employ three layers of coatings, including: a 12 weight percent phenol/formaldehyde partial resin prepress coating applied at approximately 175° C., a melamine-fortified urea/formaldehyde prepress sealer coating, and a post-press primer paint coating on the exterior surface. This door system has had poor acceptance in the market because it has experienced repeated warping due to moisture intrusion and unacceptably large deformations where the sun has disrupted the moisture equilibrium within the exterior skin. The manufacturer of this exterior door advises consumers to avoid use of a storm door, where heat may build-up above 54° C., again because of drying effects on the dimensional stability of the product. The manufacturer specifies that up to a year may be needed before a warped door caused by moisture variations can correct itself. Many discerning customers in the building trade have found these deficiencies too severe to warrant use of the doors.

The use of phenol/formaldehyde, urea/formaldehyde and other resins provides a binder system which is adequate for interior products slated for use in dry areas. However, the resins are relatively expensive, and must be used in fairly large quantities when products exhibiting high tensile strength and modulus are desired. Thus, European published patent applications EP-A-0 161 766 and EP-A-0 492 016 as well as related U.S. Pat. No. 5,017,319 to Shen teach the avoidance of synthetic adhesives by digesting lignocellulosic materials to the stage where liberated saccharides and oligosaccharides are produced, a portion of these dehydrating to produce furfural and other condensable products which then may react and crosslink, serving as a binder resin. The digestion proceeds in situ and the resulting partially digested fiber/adhesive mixture molded under heat and pressure, or the resinous adhesive may be isolated and applied to lignocellulosic or other substrates in place of more expensive synthetic adhesives.

While the molded products taught by the various Shen patents and publications may be economically produced, they suffer from a deficiency in physical properties such as tensile strength and modulus. Moreover, although the Shen adhesive is described as being waterproof, the latter is a relative term. While products produced according to Shen are suitable for interior use, these products fail both the accelerated ageing test and thickness swelling test, and thus cannot be made into commercially acceptable weatherable, exterior products.

It would be desirable to provide building materials and door systems capable for use in exterior locations which exhibit only low degrees of swelling when exposed to water; which do not exhibit blistering, peeling, or delamination, yet which can be prepared from inexpensive and easily processed lignocellulosic materials. It would be further desirable to produce entry doors and door system components which exhibit high flexural strength and modulus and further exhibit substantial retention of these properties in accelerated ageing tests. It would be still further desirable to provide door systems which can be aesthetically stained and varnished as well as capable of being painted.

SUMMARY OF THE INVENTION

The present invention pertains to weatherable building materials of compression molded lignocellulosic fibers which have been partially digested under conditions such that partial breakdown of hemicellulosic and other components takes place; contacting the fibers with a thermosettable novolac resin, optionally in conjunction with other resins, compression molding in the presence of a methylene source, and applying a prepress and/or post press impregnant which provides a water repellant but water vapor transmissive exterior.

DESCRIPTION OF THE PREFERRED EMBODIMENTS

The weatherproof construction materials of the present invention employ a unique combination of binders and coatings to produce building materials which are strong and which maintain their strength and modulus properties under extreme conditions. The subject invention materials exhibit little swelling upon exposure to moisture, even after water immersion. Moreover, the unique ability of the subject invention materials to release moisture without delamination, blistering, or other moisture-induced artifacts, allows use of the subject materials in exposed locations such as exterior doors, door jambs, thresholds, trim, etc., as well as in other weatherable building materials such as siding. A particularly useful application of the subject invention materials is in high quality door skins.

The subject invention weatherable materials are composed of lignocellulosic fibers. Such fibers should not be confused with other compressed and resin binder consolidated products such as flake board, oriented strand board, and the like. The materials are prepared from fibers, the majority of which have aspect ratios of 3–80, preferably 4–70, and most preferably 8–30. Finely ground wood products such as sawdust and the like are suitable for use only as a filler in the manufacture of the subject invention materials. Wood chips, flakes, and scrap, among other materials, may be used, but not in virgin form. Rather, during the treatment processes as hereafter described, these or other sources of lignocellulosic fibers must be digested and refined into fibers. By "refining" is meant the process of preparing fibers from lignocellulosic fiber precursor materials such as flakes and particles, etc. Minor quantities of wood flour, wood dust, or other lignocellulosic fines may be included in the lignocellulosic mix. However, such products should not constitute more than 30% by weight of the total lignocellulosics, preferably less than 15% by weight, and more preferably less than 5% by weight.

Other sources of lignocellulosic fibers are well known to the skilled artisan, and include other fibrous lignocellulosic biomass products such as natural grasses, corn stalks, wheat stalks, cotton, linen, flax, and the like. Preferably, however, the fibers are derived from green or dry wood products, i.e. wood chips, flakes, scrap, etc. Both hardwood and softwood may be used, although hardwood is preferred. As the initial treatment of the lignocellulosic fibers involves high temperature digestion at temperatures exceeding the boiling point of water, it is preferred for reasons of economy in energy usage that the fiber source be substantially dry, i.e. have a moisture content less than 18 weight percent, preferably in the range of 4 to 18 weight percent, and most preferably about 8 to 14 weight percent. However, products containing both less as well as more moisture may be used as well. Moisture content may be adjusted as desired by drying the fiber source in hot air or superheated steam, or the fiber source moisture content may be increased by addition of water.

The fiber source is preferably digested at high temperature so as to break down a considerable portion of hemicellulose and other bioses to form an in situ-generated primary binder. In the preferred process according to the invention, this digestion takes place in the presence of a crosslinkable phenol/formaldehyde resin as hereinafter defined, most preferably a novolac resin. However, in less preferred embodiments, it is possible to add the phenol/formaldehyde resin post-digestion. Post-digestion chemical processes which break down the hemicellulose and other bioses may be used as well. Such post-digestion processes which lead to similar fiber/lignin-derived binders are also "in situ" generated primary binders as that term is used herein.

The lignocellulosic raw materials preferably are digested with steam at 150° C.–225° C. The duration of exposure to the steam is inversely related to the steam temperature, but is generally for an exposure of 20–200 sec, preferably 20–120 sec. The steam softens the lignins holding the lignocellulosic fibers together prior to the defibering process, which yields finely divided lignocellulosic fiber. Any suitable defiberizing process may be used, including comminution techniques such as a hammer mill, a Szego mill, a single disk refiner for materials of predominantly green wood or a double disk refiner for predominantly lignocellulosic materials with moisture contents of 4–18 weight percent. These defiberizing processes are exemplary, and not limiting.

Some of the hemicellulosic and lignin derived carbohydrates are cleaved by pre-hydrolysis, acid hydrolysis and autohydrolysis reactions as a consequence of the time, temperature, lignocellulose source, as well as presence or absence of steam. The objective of this process step is to cause scission of some fraction of the high molecular weight hemicellulosic and lignin-derived carbohydrates as a means of solubilizing a fraction of the carbohydrates. Determination of the extent of scission is quantitatively difficult, due to the nature of the analytical chemistry extraction methods as well as the variety of natural products involved. The best gauges of the completion of digestion and refinement are by end use tests and by color change of the lignocellulosic fiber mass from light yellows to golden browns. A dark brown color and a pronounced burnt sugar odor indicates that excessive exposure to heat has occurred. This excessive digestion is not preferred for load bearing products. The resultant fiber should have a definable aspect ratio of 4–70, preferably 8–30 to provide mechanical strength and good properties for air laid web formation. Defiberization of the wood chips yields primarily individual wood fibers, but may also leave a distribution of sizes and aspect ratios including some small bundles of fibers, as well as some wood fines. The digestion to the levels required herein are easily assessed by one skilled in the art of wood fiber processing.

While not wanting to bound any particular theory, it is believed that the results of the initial exposure to heat are two-fold. The carbohydrates partially migrate to the outside surface of an area beyond the cell wall through diffusion. These carbohydrates beyond the cell wall begin to decompose through the various reactions leading to partial carbonization. The partially decomposed material appears to form an in-situ generated moisture barrier in intimate contact with the cell wall. In addition, the solubilized carbohydrates appear to react with the phenolic resins in the presence of steam when these are added at this time.

The exodus of some carbohydrates and the scission of the polymers into lower molecular weight units reduces expansion pressure on the cell wall by a reduction in physical mass as well as a reduction in polymer molar mass, also referred to as chain length, of carbohydrates inside the cell wall. The expansion factor varies linearly with a slope of one to approximately two as a polymer changes coil configuration. The magnitude of the change in expansion forces appears dependent on the degree of polymerization, a ratio of polymer weight-average molecular weight to molar mass of the monomer. It is believed that by causing scission of the carbohydrate molecules into lower molecular weight units, the degree of polymerization is reduced. The effect of decreasing the degree of polymerization is to reduce the expansion forces by a multiple ranging from one to approximately two of the decrease in weight-average molecular weight of the remaining carbohydrates.

For example, if scission split every polymer in half, the degree of polymerization would also be reduced by a factor of two. The expansion forces would, therefore, be reduced to a factor ranging from two to approximately four. The expansion force for a given amount of moisture intrusion would only be a half to a quarter as great as the unscissioned material. The result would be less dimensional change, as equivalently less counteracting forces resisting expansion would be required to re-establish equilibrium in the cell.

The dimensional stability can be further improved by causing the effective destruction and subsequent repolymerization reaction of the hemicellulosic and lignin derived carbohydrates. This happens during significant heat exposure in excess of 225° C. This improved dimensional stability is counterbalanced by the reduction in the stiffness factor of the polymer molecule because the cellulosic cell wall begins to deteriorate.

Thus, the elevated temperature digestion process is not merely related to the binding capability of in situ produced, bios-derived resins. It has been found that digestion alone, as taught by EP-A-0 161 766, EP-A-0 492 016 and U.S. Pat. No. 5,017,319, all herein incorporated by reference, is incapable of producing acceptable strength properties. It has been found that the strength properties may be improved significantly by addition of conventional binder resins, for example phenol/formaldehyde resol resins. However, these high synthetic resin content products fail thickness swelling tests and, in addition, may exhibit an increased propensity to delamination and blistering. Thus, while high temperature digestion is a necessary prerequisite to preparation of the subject invention materials, it is not alone sufficient, but must be used in conjunction with other binders. However, the simple addition of traditional phenol/formaldehyde binders alone is incapable of producing a truly weatherable product. Both secondary and tertiary "binders" must be added.

The secondary binder resin may be added prior to or during fiber digestion, or may be added after digestion, for example after refinement and collection of fibers. An aqueous or non-aqueous solution or dispersion of phenol/formaldehyde resin, optionally in conjunction with other resins, may be sprayed onto the fibers as they are collected, following collection, or at other times. Resins may also be added in rotary drum mixers, and the like. The exact mode of addition is not critical, although mixing should be as uniform as possible.

Preferably, the phenol/formaldehyde resin is added prior to or during the digestion process. The particular resin should be one which does not cure to a thermoset state under the digestion conditions. For this reason, certain phenol/formaldehyde resins are more suitable than others. The most suitable resins are those prepared at low formaldehyde to phenol ratios. Most preferably, novolac resins are employed. The novolac resins and other resins prepared at low formaldehyde/phenol ratios are somewhat hydrophobic, remain relatively thermoplastic during processing, and may be crosslinked at a later stage to a thermoset polymer.

The amount of secondary binder resin added depends upon the time of its addition, i.e. prior to or during digestion, or post digestion. In general, higher amounts of resin are required post digestion. The amount of binder resin also depends upon the binder type. Relatively larger amounts of high formaldehyde/phenol ratio (resol) resins are required as compared with novolac and low formaldehyde/phenol ratio resins. Addition of epoxy resins and other curable or co-curable resins may decrease the amount of phenol/formaldehyde binder. For example, solid epoxy resins may be added during digestion or just prior to or after refinement, while liquid epoxy resins or those with low melting points must generally be added after fiber collection.

Examples of other resins which may be added in conjunction with the second binder include unsaturated polyester resins as well as thermoplastic polymers such as polystyrene, polypropylene, polyethylene, polyalkyleneterephthalates, etc. The thermoplastic resins may aid in rendering the products more moisture resistant. However, in certain cases, they may lower the physical properties by interfering with the consolidation of the fibers. The suitability of a particular reactive or non-reactive resin additive to be used in conjunction with the phenol/formaldehyde resin may be assessed by conventional physical testing and by the accelerated weathering test. Thermoplastic polymers are preferably added the form of a dispersion or dissolved in solvent. Films of thermoplastic should generally be avoided unless manufactured to allow passage of moisture.

The amount of phenol/formaldehyde resin is broadly between 2 weight percent and 35 weight percent, preferably between 4 weight percent and 30 weight percent, more preferably between 4 weight percent and 25 weight percent, and most preferably between 4 weight percent and 20 weight percent. Amounts of from 8 weight percent to 16 weight percent, particularly 12–15 weight percent are particularly useful. Higher amounts can, of course be used, particularly if added post-digestion, but demonstrate no increase in physical properties as well as potentially lowering desirable properties such as stainability.

In the preferred embodiment, about 10–18%, most preferably about 15%, of a normally solid novolac resin is added to the lignocellulosic material to be processed, and the digestion and refining are carried out in the presence of the novolac resin. It is not known for certain why this process thus far appears to produce products with the greatest moisture resistance and weatherability. Without wishing to be bound to any particular theory, it is believed that the novolac resin may partially react with either the constituents of the cell walls of the fibers or decomposition products of the various bioses and other molecules. By whatever mechanism is operable, the net result is that weatherability and other physical properties are achieved to a greater degree when the phenol/formaldehyde resin is present during digestion as opposed to first digesting and refining, and mixing the same quantity of resin with the previously refined and digested fibers.

The combination of digestion of the lignocellulosic fiber source, coupled with pre- or post-treatment with phenol/ formaldehyde resin, creates materials with superior physical and physcio-chemical properties. However, in general, these advantageous properties are still not sufficient for producing building products capable of withstanding outdoor exposure, as reflected by the accelerated weathering test. In order to be suitable for such uses, a tertiary prepress or post press water repellant binder must be applied to the relevant product.

Unlike prior art materials where water impervious coatings, i.e. melamine/formaldehyde resins, have been applied, the tertiary water repellant binders of the subject invention must be water vapor permeable. In prior art coatings, it has been desired to block all access to water. While this total repellency has been useful in minimizing water access, in the real world, scratches, holes for fasteners, screws, nails, hinges, locksets, etc., allow entry of water into the product interior. Prior art coatings are effective or nearly as effective in preventing water egress as water ingress. Thus, water from the interior, when heated, for example by the sun, causes the fibers and binder resins to partially plasticize, weakening both the interior fiber to fiber bonding as well as the adherence of the surface coating. The trapped water is believed to be the major source of delamination and blistering which is often characteristic of prior exterior lignocellulosic fiber products.

It has now been surprisingly discovered that the aim of prior art products and processes: total water impermeability, serves to create or magnify the very problems water impermeability was sought to solve, i.e. freedom from blistering, delamination, etc. The subject invention solves these problems by applying a tertiary binder which is water repellant, but not impermeable, such that moisture which finds itself trapped within a product prepared by use of the subject materials may escape by transmission as a vapor through the water repellant coating. Thus, the tertiary coating of the subject invention materials is broadly characterized as a system which is repellant to water in the sense that the surface will not appear to be wet by liquid water, yet water vapor will readily pass through the coating. On a vertical surface, for example, water will generally run off the surface rapidly, while on a horizontal or near horizontal surface, water will often be seen to “bead”.

It must be emphasized that the tertiary binder is not a simple paint or surface coating, but rather an impregnant which both coats and penetrates to some depth in the product. Traditional factory applied primers and paints, which largely reside on the surface of the building material, are not tertiary binders as that term is used herein, although such coatings may additionally assist in protecting the product. However, it is now clear, that such film-type coatings should be vapor permeable themselves.

The tertiary binder must be highly water repellant, but must also exhibit very high water vapor permeability. Preferably, the water vapor permeability at the surface of the weatherable building material is but little different from that of the essentially non-water repellant substrate prior to application of the tertiary binder. The water vapor permeability may be measured by many techniques. A suitable technique is that of DIN 52615 where the binder to be tested is coated onto Schott glass frits with a porosity of 4, and the permeability expressed as the thickness of a stationary diffusion equivalent air layer thickness, “sd”. The sd of an untreated frit is approximately 0.03 m. Preferred tertiary binders result in sd values less than 0.3 m, preferably less than 0.2 m, more preferably less than 0.1 m, and most preferably less than about 0.08 m. At the same time, the tertiary binder, to be effectively water repellant, must decrease the wicking action of water along and through the consolidated fibers.

The tertiary binder may be a single component or may comprise two or more components applied simultaneously or subsequently. For example, one component may be applied whose function is to eliminate water wicking while a second component may establish repellency. Both components together, however, must retain water permeability. Preferably, the tertiary binder is a single composition applied prepress or postpress. Prepress application is preferred, particularly when the tertiary binder is heat curable.

Suitable tertiary binders are those which are capable of decreasing the wicking action of water by rendering the wood fibers and other ingredients hydrophobic without totally blocking the pores, etc. The hydrophobic surface coating prevents water from wicking up the fibers, and renders the surface water repellant. At the same time, however, since the pores remain open and hygroscopic pathways (i.e. transport along contiguous oligosaccharides, lignins, etc.) are not blocked, water vapor permeability remains high. It is most desirable that the tertiary binder be substantially non-fugitive; in other words being essentially irreversibly bound to the fiber-containing substrate, whether by strong physical attraction/association or by chemical bonding. Thus, simple non-functional waxes are generally unacceptable unless used in small amounts with other tertiary binders. Waxes chemically treated to contain functional groups which render them non-fugitive are suitable, particularly when used in conjunction with other tertiary binders. The tertiary binder is preferably film-forming, i.e. is capable of forming a film following evaporation of solvent, in the case of soluble binders, or by evaporation of continuous phase in the case of emulsions and/or dispersions. When dispersed in water, microemulsions are preferred over emulsions or dispersions. Suitable tertiary binders exhibit a high water contact angle when deposited as a film on a smooth substrate such as glass or polished metal, but retain substantial water vapor permeability as measured by the glass frit test, or by actual measurement of a treated substrate.

One suitable tertiary binder is VP2100, a microemulsifiable organopolysiloxane containing long chain alkylalkoxysilanes and long chain oligomeric alkylalkoxysiloxanes available from Wacker Silicones. Other suitable polysiloxanes from the same source are Wacker 43A alkoxyalkyl polysiloxane and Wacker BS 1306 amino-functional polysiloxane. Other organopolysiloxanes and organosiloxanes which are emulsifiable in water or solvents, or soluble in organic solvents are suitable, provided water vapor permeability of the substrate is maintained. VP2100 and like microemulsifiable silicones are particularly suitable as they readily form clear to hazy microemulsions upon contact with water; contain reactive groups which render the binder non-fugitive following application; and are highly hydrophobic and thus water repellant. Organosilane and organopolysiloxane compositions containing reactive groups such as Si-H, alkoxy, acetoxy, allyloxy, alkenyloxy, vinyloxy, aminoalkyl, and the like are most suitable. In some cases, addition of a catalyst to the silane and/or siloxane may be necessary, or a short bake at elevated temperature may be required to render the binder non-fugitive. Non-fugitive in this sense means that the binder will not evaporate substantially under expected conditions of use. For example, more than 50% of the applied tertiary binder solids should remain in and on the substrate when treated at a temperature of 70° C. for eight hours at 0.1 atmosphere, more preferably greater than 80%, and most preferably greater than 95%, these percents being percents by weight based on binder solids applied. Examples of other silanes and siloxanes which are suitable include those containing haloalkyl groups in addition to or in lieu of alkyl groups, e.g. fluorinated siloxanes or siloxanes substituted with trifluoroalkyl groups.

Other polymers and polymer dispersions are also suitable for use as tertiary binders. Once again, these must be relatively hydrophobic in order to provide the necessary water repellency, and must in general also contain reactive groups or highly polar groups so as to render the binder non-fugitive. Examples are polymers and oligomers of fluoroalkylacrylates and methacrylates and the like, polymeric halovinyl and vinlyidene compounds, especially those polymerized so as to include reactive groups such as anhydride, acrylate, methacrylate, and the like. Once again, the tertiary binder should form a film which exhibits a high contact angle with water and which is water vapor permeable when applied to the substrate. As indicated previously, tests of candidate compositions matching these requirements are easily performed. Fluorinated polymers which have useful water repellant properties are well known, for example, and are available from the 3M Company and DuPont.

The water repellant but water transmissive binders previously described may also be used to advantage with traditional pressed wood products such as those of consolidated wood fibers, flakes, strands, and the like, where the consolidating resin is a phenol/formaldehyde, furfural/formaldehyde, or similar resin. Such products, while not containing primary, secondary and tertiary binders, are nevertheless a considerable improvement over otherwise similar products containing water impermeable coatings.

By "phenol/formaldehyde" resin as that term is used herein is meant a reaction product of a phenolic compound and an aldehyde, operationally in the presence of other comonomers and nitrogen scavengers such as urea, melamine, dicyandiamide, and the like. Suitable phenols include, for example, 4,4'-dihydroxybiphenyl, resorcinol, and phenol, particularly the latter. Suitable aldehydes are well known and include butyraldehyde, acetaldehyde, and in particular, formaldehyde. For the greatest weatherability, it has been found preferable thus far to use phenol/formaldehyde resins prepared at low formaldehyde/phenol ratios, in particular, novolac resins. A variety of formaldehyde-reactive comonomers may be used in conjunction with phenols, such as the various furans, furfural, melamine, and the like.

Whichever resins are used, it is desirable that suitable curing/cross-liking agents be present. The most preferred agents are methylene sources such as hexamethylenetetramine ("hexa"). The latter is most preferably used in at least "stoichiometric amount". This amount is about 8 to 12 weight percent based on the weight of phenol/formaldehyde resin solids. Preferably, the hexamethylenetetramine is used in excess, for about 20–30% excess. It has been found that excess "hexa" is surprisingly efficient in increasing weatherability. However, hexa in amounts in excess of 30% of stoichiometry does not significantly further improve properties, and may cause some properties to decline. An upper limit of hexamethylenetetramine is about 40% in excess of stoichiometry, i.e., about 18% based on the weight of phenol/formaldehyde resin solids. Other methylene sources include paraformaldehyde/ammonium carbonate, and reaction products of aldehydes with aromatic amines. Hexa is preferred.

Numerous additional resins may be added prepress to either enhance physical properties or weatherability, or both. Examples include thermoplastic novolac phenol/formaldehyde, thermoset resol phenol/formaldehyde, naphthylol/formaldehyde, melamine-fortified urea/formaldehyde, resorcinol/formaldehyde, urea/formaldehyde, phenol/furfural, lignin furfural/aniline, and isocyanate resins, to name but a few.

Up to 70 volume percent fillers, additional reinforcing fibers, and modifiers may be added to the material during the prepress blending operations to improve the pressure formed article. These include, but are not limited to thermomechanical pulp, chemithermomechanical pulp, prepared agricultural lignocellulosic wastes, sawdust, excelsior, mineral fillers, micas, wollastonite, glass reinforcing fibers, glass fiber reinforcing veil mats, carbon reinforcing fibers, aramid reinforcing fibers, foaming/blowing agents, fungicides, mildewcides, pigments, dyestuffs, thermoplastic resins, fragrances, and combinations thereof.

Prior to pressure forming, a prepress sealer may be applied to form an additional moisture barrier. The prepress sealer may come in the form of a liquid coating, powder coat, in-mold injected coating, or a film placed in the mold with the material charge. The prepress sealer, like the tertiary binder, must not render the surface water impermeable.

The subject invention building materials, whether door skins, detail moldings, door jambs and/or thresholds, siding, sheetboard, or the like, are molded in a press under heat and pressure, in batch or continuous molding processes. The materials may have a textured exterior dictated by the mold surface. A variety of molds are suitable. Most preferred are molds prepared by nickel coating a cast of a real object whose surface is to be mimicked by chemical vapor deposition, as disclosed in U.S. Pat. No. 5,169,549 which is herein incorporated by reference.

The material is pressure formed at pressure of 120–14,500 KPa with or without steam. Pressure forming processes can include high pressure compression molding, low pressure compression molding, ram extrusion, ram injection, ram injection-compression, hydroforming, explosive forming, twin sheet or single sheet thermoforming with compression assist, vacuum-draw forming, and vacuum-stretch forming, preferably high pressure compression molding between 1,700 kPa and 6,800 kPa.

The steam exposure can range from 0 to 240 seconds, preferably 20–90 seconds at 198–225° C., and may be administered in multiple increments once the mold is essentially closed. Venting the mold through releasing mold pressure, evacuating the mold, or opening a stopcock to vent may be needed at several intervals during the pressure forming cycle to prevent blisters and eliminate accumulated volatiles.

The material may be pressed to a thickness of 0.75 mm to 45 mm if steam is applied only from one side of the platen. The thickness may be extended to 100 mm if steam is applied from both sides of the platen. The resultant density of product ranges from 560 $kg/m^3$ to 1200 $kg/m^3$, preferably 800–1000 $kg/m^3$ to eliminate porosity suitable for capillary infiltration, provide mechanical strength, while fostering lower material usage costs as well as reducing the incidence of surface blisters.

In order to reduce the pressure forming cycle time, a post-press infrared, preferably far-infrared; radio frequency; or microwave bake oven may be substituted to continue the curing of the various resins. The curing oven ranges in temperature from 198° C.–225° C. with exposure inversely related from 20–120 sec depending on thickness of the pressure formed part and the wavelength of energy chosen.

The materials of the subject invention are characterized by an at least 50% retention of initial tensile strength and flexural strength as determined by the ageing cycles specified by ASTM D-1037-95, and a thickness swelling of less than 20%, preferably less than 12%, and most preferably less than 10%. No thickness swelling is, of course most desirable. Thickness swelling in the range of 2–8% is considered exceptional. In addition to the above, the materials of the subject invention must pass the accelerated ageing test defined hereafter.

The accelerated ageing test for exterior door slabs is used as a discriminating test for durability of exterior doors and other weatherable products. Typical environmental cycling completely immerses the sample in the test environment. A more realistic approach to door slab and other exterior product testing exposes only the exterior face of the product to the environmental extremes. The test method described in this standard is applied to door slabs mounted in an environmental chamber such that the exterior face (as installed in the field) of the slab is toward the interior of the chamber. The interior face (as installed in the field) of the slab is toward the exterior of the chamber.

The environmental cycle of the accelerated ageing test makes use of temperature extremes from 104° C. to −29° C., while also simulating rain and dry conditions. The time for one complete cycle is 24 hours. The test uses extremes of temperature and moisture to accelerate changes in the door slab which occur naturally during exposure to changing weather conditions. Doors are mounted into jambs installed into the walls of the chamber. The installation of the slab exposes individual areas of the door slab or other product to a degree of exposure similar to that they would be expected to receive in a field installation. The chamber is equipped with atomizing spray heads which are capable of completely wetting the exposed surface of any door slab under testing. The chamber is also capable of maintaining the test conditions as described below.

The door slab is representative of standard production and is finished according to the manufacturer's recommended instructions for residential exterior use. The finish is then given a minimum of 10 days to dry/cure prior to testing. The door slab can be fitted with standard hardware (hinges, lockset) for exterior residential use. The sample is inspected prior to testing. Any warp or cosmetic defects are recorded and any obvious structural defects or deviations from standard product are noted. The environmental cycle is as follows:

| Segment | Duration (hours) | Temperature (° C.) Start | Temperature (° F.) End | Rain Spray |
|---|---|---|---|---|
| 1 | ½ | 26 | −29 | No |
| 2 | 3 | −29 | −29 | No |
| 3 | ½ | −29 | 4 | No |
| 4 | 3 | 4 | 26 | Yes |
| 5 | 1 | 26 | 104 | No |
| 6 | 2 | 104 | 104 | No |
| 7 | 1 | 104 | 26 | Yes |
| 8 | 3 | 26 | 15 | Yes |
| 9 | ½ | 15 | −29 | No |
| 10 | 3 | −29 | −29 | No |
| 11 | ½ | −29 | 104 | No |
| 12 | 5 | 104 | 104 | No |
| 13 | ½ | 104 | 26 | No |

A door which passes the accelerated ageing test will have no recorded aesthetic or performance defects after 30 cycles.

The weatherable building products prepared in accordance with the subject invention have a density in excess of 35 lbs/ft$^3$, (560 Kg/m$^3$) preferably in excess of 44 lbs/ft$^3$ (700 Kg/m$^3$), and most preferably about 48 lbs/ft$^3$ (770 Kg/m$^3$) or more; a flex strength in excess of 4000 psi (27.5 MPa); a modulus of elasticity in excess of 3 GPa, preferably in excess of 4 GPa; a thickness swelling of less than 12%, preferably less than 8%, and more preferably less than 5%; and an internal bond in excess of about 1.0 MPa, preferably in excess of 1.5 MPa, and more preferably in excess of 2.0 MPa. Thickness swelling referred to herein is as measured by ASTM D-1037-95.

Having generally described this invention, a further understanding can be obtained by reference to certain specific examples which are provided herein for purposes of illustration only and are not intended to be limiting unless otherwise specified.

Example 1 and Comparative Example C1

The present invention may be directed to a door assembly having an inserted full or partial core or a core formed in-situ positioned within a frame. A pair of opposed compression molded skins with downstanding ribs made by the instant invention are attached to the wood frame. There are edges adjacent to the skin. The skins are made of a composite board of hardwood fiber filled novolac phenolic resin prepared with 15 weight percent general purpose novolac phenolic resin, having no tailored molecular weight distribution, such as Georgia-Pacific™ brand 2050 resin. The hardwood wood raw materials are comminuted to pin chip size by prior art means such as a hammer mill. The pin chips should pass a Ro-Tap™ Screening System screen of 76.2 mm and not pass 3.18 mm. No inert mineral fillers or reinforcing fibers are added to material in this example.

The wood pin chips are preferably prepared for refining by partial digestion in a steam chamber where the lignin is softened by exposure for a period of exposure lasting 30–600 seconds, preferably about 300 seconds at 150–200° C. The progress of digestion is noted by observing the color of the fibers. A color range from gold to medium brown color is desired. With the exception of products where structural strength requirements are minimal, digestion to a dark brown color and/or burnt sugar odor is undesirable. A tertiary binder that is vapor permeable such as an organopolysiloxane, preferably an alkoxyalkyl polysiloxane such as Wacker 43A are added as an emulsion of 20–40 weight % of 43 weight % solids into the digested intimately coating the fibers.

The partially digested fibers are formed into a near net shape mat or pre-formed shape using an air-lay or mechanical forming web process typically found in prior art medium density fiberboard pilot scale operations. Shaping is accomplished, as needed, by trim saws, wire brushes, and very low compression conveyors. A rectangular plate having a single ply and a sheet weight of 960 kg/m$^3$ is preferred, but the sheet weight can range from 560 to 1200 kg/m$^3$.

A solution of 42.5 weight percent hexamethylenetetramine is sprayed onto the fibers used to form the mat upon cooling below 100° C. after refinement. The quantity of hexa was sufficient to supply a quantity of 20 weight percent hexamethylenetetramine in excess of stoichiometry relative to novolac resin solids. When the hexamethylenetetramine reaches decomposition temperature, the released formaldehyde will complete the novolac curing reaction between phenol and formaldehyde constituents of the novolac. The excess will react as a crosslinking agent between the carbohydrates and either themselves or the phenolic resins. The spray is allowed to air dry during conveyance. Additional solutions of 3 weight % sodium borate and petroleum slack wax are added as a fungicide and mold release, respectively. Neither prepress coating, or film sealer nor additional resin were added in this step in this example.

The near-net shape mat is placed into a matched mold for an exterior door skin with wood grain texturing simulation on the surface. The mat is placed into the pre-heated mold, which is set at 198–225° C. The press is closed at a rate of 6–10 in/min as it makes contact with the mat. The pressure is increased to 3000 kPa. Steam at 198–225° C. is applied for 60 seconds from one side of the mold. Curing continues to a total of 240 seconds before the press is opened.

Each of the door skins produced in this manner has an interior and an exterior surface. The interior surface is adjacent to the core in the assembly. The exterior surface has either a textured surface consisting of level portions and depressions or a smooth surface. The depressions have a range of depth from 0.25 mm to about 1.0 mm from the level portions. The undercuts have a range in the extent of undercutting from about 0.025 mm to about 0.10 mm from the depressions. Preferably, skin further includes undercuts adjacent to the depressions. This is made possible by tailoring in a predetermined manner the material flexibility and mold release agents when partially cured and hot, and the use of an accurately replicated mold surface. The process window of resin content, cure state, and resin molecular weight ranges is best assessed by product testing. A use test is most applicable.

Each door skin preferably has a downstanding rib at the edge to provide resistance to crushing damage of the edge during manufacture, transport, or use. In addition, downstanding ribs can aid in alignment during assembly as the door skin engages or is adjacent to the frame and other components such as a lock block.

Each door skin in this embodiment is sealed on both the inside surface and outside surface against moisture intrusion by a post-press sealer applied as a primering/painting process. The post-press sealer is formulated from an emulsion of 43 weight percent solids alkylalkoxysiloxane such as 0.1–5 weight percent of a 50 weight percent solids siloxane polymer such as Sealer Science Siloxane Plus™ or Wacker 1306 and optionally 20–40 weight percent of Wacker 43A; 30–50 weight percent of a 43 weight percent solids acrylic resin, such as BF Goodrich Carboset™; and 0.1–10 weight percent of a resin preferably having a lower glass transition temperature than the siloxane and acrylic resins, such as an ethylene/vinyl chloride resin with glass transition temperature between 11° C. and 35° C., such as Air Products Airflex™ 4514. Additional solvents, siloxane and organopolysiloxanes, adjuvants, fungicide, mildewcide, as well as fillers and extenders may be added up to 49.8 weight percent.

The entire door assembly is painted with an opaque pigmented coating manufactured from acrylic resins with glass transition temperatures between 45 and 65° C., a compatible ultraviolet light absorption and antioxidant package, and various opaque pigments. The paint acts as a moisture barrier as well as a barrier to photolytic damage, but the properties are adjusted so that abrasion resistance, blocking resistance, and pigment volume content are increased to acceptable cost and performance levels. The subject invention door is compared with a commercial "exterior" door believed to contain 10–12% melamine/urea/formaldehyde resol resin added prepress, with a melamine-fortified urea/formaldehyde post press sealer.

TABLE 1

Mechanical and performance properties

| Property | Example 1 Door | Fiberboard Door |
|---|---|---|
| Density | 880 kg/$m^3$ | 1010 kg/$m^3$ |
| Modulus of rupture[1] (MOR) | 73.4 MPa | 57.2 MPa |
| Modulus of elasticity[2] (MOE) | 5.1 GPa | 3.5 GPa |
| % Retention of MOR[3] | 74.5% | 41.2% |
| % Retention of MOE[3] | 67.7% | 33.0% |
| Thickness swelling[4] | 5% | 19% |
| Gardner impact[5] | 16.1 cm-kgf | 11.5 cm-kgf |
| Internal Bond[6] | 2.1 MPa | 1.0 MPa |

[1]ASTM D-1037 Sections 21–26
[2]ASTM D-1037 Sections 11–18, 20
[3]ASTM D-1037 Sections 11–18, 20–26 with 2 hr boiling water accelerated ageing per Canadian Standards Agency method 0188
[4]ASTM D-1037 Sections 170, 171
[5]ASTM D4226
[6]ASTM D-1037 Sections 28–32

Example 2

In this example, process parameters are purposefully adjusted so as to be non-optimal. In particular, fiber digestion is purposefully prolonged to the medium to dark brown stage. The degradation of exterior durability and physical performance is demonstrated in this example as the minimum process and material effects are used in manufacturing the article.

A door is prepared from a prefabricated panel assembly having an inserted full or partial core or a core formed in-situ positioned within a cavity between the to opposed skins. A pair of opposed low pressure compression molded skins with interlocking flanges adjacent to the skin made by the instant invention are integral to the skin and constitute the vertical sides of the cavity. The skins are made of a composite board of kiln-dried hardwood filled novolac resin prepared with 17–25 weight % novolac, such as Georgia-Pacific™ 2096 Novolac powdered resin.

The hardwood pin chips are prepared for refining by digestion in a steam chamber as described in Example 1. About 10 weight percent of novolac resin is added at this time. The steam exposure ranges from 50 to 80 seconds at 170–180° C. Because of extended digestion, the fibers become medium brown to a dark reddish brown color.

The prepared fiber is blended with thermoplastic textile fibers, which function as adjuvants. The combination is formed into a near-net shape roll of 560 kg/$m^3$ fiber using a prior art process such as disclosed in U.S. Pat. No. 4,474,846, herein incorporated by reference.

A solution of 42.5 weight percent hexamethylenetetramine and 0–8 weight % of powdered novolac phenolic resin are added after refining in the prepress sealer stage. No additional prepress film or coating sealers are added. The hexamethylenetetramine is substantially stoichiometric.

The two layers of near-net shaped mat are placed in a matched mold for an exterior insulated prefabricated panel skin. The skin is not textured. The mold is closed at a rate of 15 in/min. The pressure is increased to 8890 kilonewtons for the 1.2 m×2.4 m sheet. No steam is applied. The pre-heated mold temperature ranges from 170–180° C.

A post-press coating sealer as described in Example 1 is applied. A finish coat of mineral spirit based stain and water-based topcoat, such as from the Therma-Tru™ Stain Kit is applied.

TABLE 2

Mechanical Properties

| Property | Example 2 |
|---|---|
| Density | 1010 kg/$m^3$ |
| Modulus of rupture (MOR) | 19.3 MPa |
| Modulus of elasticity (MOE) | 2.9 GPa |
| % Retention of MOR | 60.7% |
| % Retention of MOE | 48.0% |
| Thickness swelling | 11% |
| Gardner impact | 13.8 cm-kgf |
| Internal Bond | 1.0 MPa |

As can be seen from the physical properties, modulus of rupture and modulus of elasticity are both considerably lower than those of the door of Example 1, despite the higher density of the Example 2 door. However, the modulus of elasticity is similar to that of the commercial "exterior" door, the impact strength is higher, and importantly, the thickness swelling is considerably better, while the internal bond strength is identical.

Examples 3 and 4 and Comparative Example C2

The effect of the extent of exposure to heat for the hemicellulosic and lignin derived carbohydrates, as well as the effect of novolac resin and steam used in combination or independently with the carbohydrate decomposition is demonstrated by the following example, the fiber digestion of which forms the outer boundary of the subject invention.

The hardwood and softwood mixture of pin chips are prepared for refining in the same manner as in Examples 1 and 2. Digestion occurs in a steam chamber capable of achieving higher steam pressures, such as a Stake™ digester, where the lignin is softened and various hydrolysis processes are concurrently advanced. No novolac was applied intimately in the digestion or refinement stages. The steam exposure is for a predetermined time ranging from 60 to 150 seconds at 205–225° C. The resultant fibers are a medium brown to a dark reddish brown color. A distinct odor of caramelized sugar is evident.

The novolac resin content is varied from 0 (Comparative Example C2), 5, and 10 weight percent, applied as a prepress step additive. The prepared fiber is blended with thermoplastic textile fibers, which function as adjuvants. The combination is formed into a near-net shape roll of 930–1030 kg/$m^3$ fiber using the previously cited prior art mat-forming process.

A stoichiometric quantity of a 42.5 weight % hexamethylenetetramine solution is added in the prepress stage after refining. No additional prepress film or coating sealers are added.

The two layers of near-net shaped mat are placed in a matched mold for an exterior insulated door skin. The skin is textured as in Example 1. The mold is closed at a rate of 8 in/min. The pressure is increased to 8890 kilonewtons for the 0.9 m×2.0 m sheet. No steam is applied. The pre-heated mold temperature is a nominal 204° C. The heat exposure is for 180 seconds.

TABLE 3

Mechanical Properties for Example 3

| Property | Comparative Example C2 | Example 3 | Example 4 |
|---|---|---|---|
| Density | 890 kg/$m^3$ | 1020 kg/$m^3$ | 995 kg/$m^3$ |
| Modulus of rupture (MOR) | 17.4 MPa | 36.1 MPa | 36.7 MPa |
| Modulus of elasticity (MOE) | 2.0 GPa | 3.3 GPa | 3.1 GPa |
| % Retention of MOR | 59% | 63% | 65% |
| % Retention of MOE | 46% | 52% | 63% |
| Thickness swelling | 10% | −2% | −2% |

The use of thermoplastic fibers together with advanced decomposition of the carbohydrates is demonstrated to reduce the thickness swelling, but at a sacrifice of reduced mechanical strength. The Comparative example, containing no novolac resin, has much higher thickness swelling and noticeably lower physical properties, indicating that an in situ-derived binder such as that disclosed by Shen is not suitable for commercial products. The properties of the subject invention doors are acceptable for exterior use, although higher modulus values would be preferred. The thickness swelling values are excellent, however.

Examples 5 and 6 and Comparative Example C3

The same wood fiber materials are then treated with steam at 198° C. for 180 seconds and novolac at 0% (Comparative Example C3), 5%, and 10% concentrations using intimate blending as described in Example 1 instead of being added during the prepress additive step.

TABLE 4

| Property | Comparative Example C3 | Example 5 | Example 6 |
|---|---|---|---|
| Density | 1025 kg/$m^3$ | 977 kg/$m^3$ | 977 kg/$m^3$ |
| Modulus of rupture (MOR) | 7.7 MPa | 45 MPa | 55 MPa |
| Modulus of elasticity (MOE) | 2.7 GPa | 3.0 GPa | 3.6 GPa |
| % Retention of MOR | 75% | 75% | 89% |
| % Retention of MOE | 64% | 66.% | 61% |
| Thickness swelling | 3% | 2% | 2% |

While the comparative example door shows good thickness swelling, its strength properties are very poor, despite being of slightly higher density.

Example 7

The instant invention is also directed to exterior trim and siding for residential housing having a single profile produced by a ram extrusion process accompanied by a rotary shaping mold and/or vacuum sizing equipment for cooling to net shape and size. The 3–6 mm thick siding has nailing flanges with slots for expansion and contraction with heat and humidity. Such slots have been used before, but absence of the ability to expand and contract has been shown to cause buckling of skins of this thickness when repeatedly cycled from −29° C. to 104° C. in the presence of moisture, as in the weathering test described previously.

The material is a hardwood wood pin chip as described in Example 1. It contains 15–40 weight % phenolic resin. The first 17 weight % is intimately blended with the fiber as novolac powder as described in Example 1. The balance of the phenolic resin is added as resol phenolic in the form of a 'prepress' sealer. An alkylalkoxysiloxane, siloxane polymer, and acrylic resin sealer from Example 1, as well as hexamethylenetetramine prepress sealers are added contemporaneously with the resol phenolic resin, though not from a single admixture due to pH and other compatibility considerations.

Prior art methods of ram extrusion of wood particleboard products are well known and may be adapted to this finer material. The extrusion barrel is heated to 198–225° C. with prior art injections of saturated steam into the barrel at the same temperature. The residence time at this temperature is 180–240 seconds.

The extruded board exits the extrusion barrel into the shaping area where prior art cooling fixtures are employed. In the same area using vacuum calibrators in a vacuum tank, a coating of 51 weight % ethylene-vinyl chloride of glass transition temperature of 0–10° C. and 49 weight % vinylidene chloride is applied while the pores are partially evacuated to allow better penetration of the "post-press" sealer. Contemporaneously, a solution 0.25–1.0 weight % of a water miscible fungicide such as Polyphase™ P20T available from Troysan is applied to both sides of the siding thereby reducing fungal and mildew attack from the unexposed surface of the siding. The board exits the vacuum chamber and is allowed to dry in a 3–4 minute far infrared convection oven.

Example 8

In this example, an additional method for making continuous or semi-continuous medium or high density fiberboard is taught using the materials and processes in the instant invention.

Hardwood pin chips as described in Example 1 are prepared with 8–17 weight % novolac resin. The coated fibers are deposited as a 3 mm and 1200 kg/$m^3$ layer on a moving conveyor using a conventional forming head to randomize the fiber orientation. Solutions of hexamethylenetetramine, sodium zincate as in Example 1, as well as 0.1–3 weight % of melted montan wax, such as manufactured by Jackson Valley Energy Partners, LP, are applied to the to the coated fiber on the conveyor.

A second layer of filler material blend of sawdust and 8–15 weight % novolac phenolic resin, prepared by simple mixing, is deposited on the first layer in sufficient quantity to make a 10 mm thick board with a total density of approximately 800–1050 kg./$m^3$. Solutions of hexamethylenetetramine and sodium borate as in Example 1 are applied. No wax is used. Some inert fillers such as mineral fillers can be added as adjuvants for mechanical properties improvements.

A third layer identical to the first one, including the various curing and treating solutions are deposited and applied, respectively to form a balanced composite.

The entire mat of coated fibers is conveyed under increasing compression to a predetermined thickness of approximately 15 mm. The conveyor enters an area where the conveyor is appropriately sealed to gases by walls encasing the conveyor. A plurality of predetermined venting regions corresponding to the breathing cycles of the molding operation in Example 1 are built where the cross-sectional area of the walls is increased for a period and a vent is installed. Steam is then applied at 198–225° C. as the consolidated mat is conveyed forward for approximately 240 seconds. The temperature within the mat rises to the temperature of the steam within about 10–20 seconds. Upon application of the steam, the coated fiber mat consolidates quickly under minimum pressure. The conveyor compression force undergoes a substantial ramp correlated with the onset of this steam process. The cumulative pressure is approximately 120 kPa or greater as needed for desired density. The emerging fiberboard is painted with a prior art acrylic primer coating and baked in a conventional far infrared drying oven to dry the paint.

Example 9

This example further demonstrates application of the post-press sealing coating in a manner that assures good penetration of the coatings into the capillary pores of the molded articles. Hardwood pin chips as described in Example 1 are prepared with 8–17 weight % novolac resin, prepared as a mat and hexamethylenetetramine applied as in Example 1. The near-net shape mat is placed into a matched mold for an exterior door skin with wood grain texturing simulation on the surface. The mat is placed into the pre-heated mold, which is set at 198–225° C. The press is closed at a rate of 6–10 in/min as it makes contact with the mat. The pressure is increased to 3000 kPa. Steam at 198–225° C. is applied for 30 seconds from one side of the mold. The pressure is released in order to breathe the mold, following which pressure is restored and steam again applied at the same temperature for an additional 60 seconds.

Upon completion of the steaming, the pressure is released. A post-press tertiary binder is injected into the mold by high pressure injection pumps. Using a tab design, which was incorporated into the molded article and the tool, the flow of the 'post-press coating sealer' is directed along the entire face of the textured surface. The composition of the tertiary binder is the same as in Example 1. The pressure is restored for 60 seconds.

The pressure is released again. An in-mold coating paint known in the prior art is injected over the top of the 'post-press coating sealer' using the type of same injection pump system and tab design. The pressure is restored. The paint is allowed to cure according to manufacturer's recommendation or 60 seconds whichever is longer. The pressure is released, the mold opened, and the article removed. The article receives no further coating.

Example 10 and Comparative Examples C4 and C5

Door assemblies as described in Example 1 of prior art high density fiberboard with post-press sealers of either (a) 51 weight % ethylene vinyl chloride and 49 weight % vinylidene chloride;

(b) melamine-fortified urea formaldehyde resin; or (c) 30 weight % aminofunctional polydimethylsiloxane, 0.8 weight % siloxane polymer, 41 weight % acrylic resin, and 4.1 weight % ethylene vinyl chloride, were tested in both an environmental chamber and in exterior door applications. Each door was painted with acrylic latex paint. The exposure in the test chamber included diurnal cycles of −40 to 220° C., the equivalent of unprotected arctic weather and a dark-colored door behind a storm door. Moisture was applied twice daily to provide a steam cycle and a freeze-thaw cycle. The results of the environmental testing is displayed in Table 4.

TABLE 4

| Blistering of Paint Coatings Over Post-Press Sealer Options | | |
|---|---|---|
| Door | Post-Press Coating | Result |
| Example 10 | c | No blistering |
| Example C4 | a | Wicking and blistering |
| Example C5 | b | Wicking and blistering |

Examples 11, 12, and 13

These examples demonstrate the effect of excess curing agent on the physical properties and the retention of those properties.

Hardwood pin chips as described in Example 1 are prepared with 22 weight % novolac resin. A solution of 42.5 weight % hexamethylenetetramine is sprayed in sufficient quantity so as to place a quantity of 12, 20, and 28 weight % hexamethylenetetramine in excess of stoichiometry of the novolac resin onto the mat. The spray is allowed to air dry during conveyance. Additional solutions of 3 weight % borax and petroleum slack wax are added as a fungicide and mold release, respectively. No other prepress coating or additional resin were added in this step in this example.

The near-net shape mat is placed into a matched mold for an exterior door skin with wood grain texturing simulation on the surface. The mat is placed into the pre-heated mold, which is set at 198–225° C. The press is closed at a rate of 6–10 in/min as it makes contact with the mat. The pressure is increased to 5380 kPa. Steam at 198–225° C. is applied for 30 seconds from one side of the mold after a delay of 60 seconds. The pressure is released in order to breathe the mold. Pressure is restored. Curing continues to a total of 240 seconds before the press is opened. Physical properties are measured and reported in Table 5.

TABLE 5

Physical Properties as a Function of Hexamethylenetetramine Content

| | Excess Hexamethylenetetramine Content | | |
|---|---|---|---|
| Physical Property | 12 Weight % | 20 Weight % | 28 Weight % |
| Modulus of Rupture | 37.3 MPa | 51.1 MPa | 42.9 MPa |
| Modulus of Elasticity | 3.1 GPa | 3.9 GPa | 3.4 GPa |
| % Retention of MOR | 78.6% | 71.6% | 58.9% |
| % Retention of MOE | 55.5% | 60.1% | 62.8% |
| Thickness Swelling | 7% | 9% | 4% |

It is noted that the physical properties have virtually leveled off at a hexa content of 20% in excess of stoichiometry. Further increase in hexa leads to a slight decrease in properties in general, although thickness swelling is reduced slightly.

Having now fully described the invention, it will be apparent to one of ordinary skill in the art that many changes and modifications can be made thereto without departing from the spirit or scope of the invention as set forth herein.

What is claimed is:

1. A weatherable building material product exhibiting less than 12% thickness swelling, comprising heat and pressure consolidated:

a) lignocellulosic fibers prepared by refining a partially digested lignocellulosic fiber precursor, said partially digested lignocellulosic fiber precursor containing an in-situ generated primary binder formed by the partial digestion of said lignocellulosic fiber precursor;

b) from about 2 weight percent to about 35 weight percent of a phenol/formaldehyde secondary binder resin, said weight percent of binder resin relative to the sum of a) and b);

a surface of said product impregnated with one or more non-fugitive tertiary binder(s) which renders said surface water repellant but water vapor transmissive.

2. The product of claim 1 wherein said phenol/formaldehyde resin comprises from 2 to about 20 weight percent of a normally solid novolac resin added to said lignocellulosic fiber precursor during digestion and/or refining of said precursor to obtain lignocellulosic fibers.

3. The product of claim 1 wherein said phenol/formaldehyde secondary binder resin comprises a novolac resin present in an amount of from 8 to 17 weight percent.

4. The product of claim 1 wherein said phenol/formaldehyde resin is cured by a stoichiometric amount or greater of a methylene source.

5. The product of claim 4 wherein said methylene source comprises hexamethylenetetramine.

6. The product of claim 1 wherein said phenol/formaldehyde is cured by addition of an amount of hexamethylenetetramine in an amount of 8% by weight relative to the weight of said phenol/formaldehyde resin solids to about 40% by weight relative to the weight of said phenol/formaldehyde resin solids.

7. The product of claim 1 wherein said tertiary binder comprises a film forming binder which exhibits a high contact angle with water and has a water vapor permeability of less than about 0.3 m as expressed by the thickness of the stationary diffusion equivalent of air layer thickness.

8. The product of claim 1 wherein said tertiary binder comprises a microemulsion of one or more hydrophobicizing agents.

9. The product of claim 1 wherein said tertiary binder, prior to application thereof, comprises an aqueous microemulsion comprising organosilane and/or organosiloxane resins bearing reactive functional groups.

10. A door skin having a thickness of from about 1 mm to about 10 mm along the rail and/or stile portions thereof, said door skin retaining at least 50% of said door skin's initial tensile strength as measured by ASTM D-638 and flexural strength when tested in accordance with ASTM D-790, said skin further passing the accelerated ageing test and exhibiting less than 12% thickness swelling, said skin comprising the building material product of claim 1.

11. A door skin having a thickness of from about 1 mm to about 10 mm along the rail and/or stile portions thereof, said door skin retaining at least 50% of said door skin's initial tensile strength as measured by ASTM D-638 and flexural strength when tested in accordance with ASTM D-790, said skin further passing the accelerated ageing test and exhibiting less than 12% thickness swelling, said skin comprising the building material of claim 2.

12. A door skin having a thickness of from about 1 mm to about 10 mm along the rail and/or stile portions thereof, said door skin retaining at least 50% of said door skin's initial tensile strength as measured by ASTM D-638 and flexural strength when tested in accordance with ASTM D-790, said skin further passing the accelerated ageing test and exhibiting less than 12% thickness swelling, said skin comprising the building material of claim 3.

13. A door skin having a thickness of from about 1 mm to about 10 mm along the rail and/or stile portions thereof, said door skin retaining at least 50% of said door skin's initial tensile strength as measured by ASTM D-638 and flexural strength when tested in accordance with ASTM D-790, said skin further passing the accelerated ageing test and exhibiting less than 12% thickness swelling, said skin comprising the building material of claim 4.

14. A door skin having a thickness of from about 1 mm to about 10 mm along the rail and/or stile portions thereof, said door skin retaining at least 50% of said door skin's initial tensile strength as measured by ASTM D-638 and flexural strength when tested in accordance with ASTM D-790, said skin further passing the accelerated ageing test and exhibiting less than 12% thickness swelling, said skin comprising the building material of claim 5.

15. A door skin having a thickness of from about 1 mm to about 10 mm along the rail and/or stile portions thereof, said door skin retaining at least 50% of said door skin's initial tensile strength as measured by ASTM D-638 and flexural strength when tested in accordance with ASTM D-790, said skin further passing the accelerated ageing test and exhibiting less than 12% thickness swelling, said skin comprising the building material of claim 6.

16. A door skin having a thickness of from about 1 mm to about 10 mm along the rail and/or stile portions thereof, said door skin retaining at least 50% of said door skin's initial tensile strength as measured by ASTM D-638 and flexural strength when tested in accordance with ASTM D-790, said skin further passing the accelerated ageing test and exhibiting less than 12% thickness swelling, said skin comprising the building material of claim 7.

17. A door skin having a thickness of from about 1 mm to about 10 mm along the rail and/or stile portions thereof, said door skin retaining at least 50% of said door skin's initial tensile strength as measured by ASTM D-638 and flexural strength when tested in accordance with ASTM D-790, said skin further passing the accelerated ageing test and exhibiting less than 12% thickness swelling, said skin comprising the building material of claim 8.

18. A door skin having a thickness of from about 1 mm to about 10 mm along the rail and/or stile portions thereof, said door skin retaining at least 50% of said door skin's initial tensile strength as measured by ASTM D-638 and flexural strength when tested in accordance with ASTM D-790, said skin further passing the accelerated ageing test and exhibiting less than 12% thickness swelling, said skin comprising the building material of claim 9.

19. A door skin having a thickness of from about 1 mm to about 10 mm along the rail and/or stile portions thereof, said door skin retaining at least 50% of said door skin's initial tensile strength when tested in accordance with ASTM D-638 and flexural strength when tested in accordance with ASTM D-790, said skin further passing the accelerated ageing test and exhibiting less than 12% thickness swelling, said skin comprising partially digested lignocellulosic fibers containing an in situ-derived primary binder and a phenol/formaldehyde secondary binder; said partially digested lignocellulosic fibers, primary binder, and secondary binder consolidated under heat and pressure to form a weatherable building material having a density in excess of 560 $Kg/m^3$; a flex strength in excess of 4000 psi, a modulus of elasticity in excess of 4 GPa and an internal bond greater than 1.0 MPa, said weatherable building material treated with a water repellant and water vapor permeable impregnant.

20. A weatherable building product having a thickness swelling of less than 10% and which passes the accelerated ageing test, said product prepared by the process of:

a) partially digesting a lignocellulosic fiber precursor at a temperature and for a time sufficient to form, following refinement into lignocellulosic fibers, a golden to medium brown partially digested lignocellulosic fiber product;

b) adding, prior to or during partial digestion and/or refinement of said lignocellulosic fiber precursors, from 8 weight percent to about 20 weight percent of a normally solid novolac resin, said weight percents of said novolac resin based on dry wood solids weight, to form novolac-containing partially digested lignocellulosic fibers;

c) adding hexamethylenetetramine to said novolac-containing partially digested lignocellulosic fibers in an amount of from about 8% by weight to about 30% by weight relative to the weight of the sum of novolac resin solids and any other phenol/formaldehyde resin solids to form a curable fiber product;

d) curing said curable fiber product under heat and pressure to form a cured product having a density of about 800 $kg/m^3$ or more;

e) treating said cured product with a non-fugitive tertiary binder comprising one or more hydrophobic substances such that the surface of said product is rendered water repellant but water vapor transmissive.

21. The product of claim 20 wherein said tertiary binder comprises one or more organosiloxane resins.

22. The product of claim 21 wherein said tertiary binder further comprises an acrylic resin.

23. The product of claim 22 wherein said tertiary binder further comprises an ethylene/vinyl chloride resin.

24. A weatherable building product having a thickness swelling of less than 10% and which passes the accelerated ageing test, said product prepared by the process of:

a) partially digesting a lignocellulosic fiber precursor at a temperature and for a time sufficient to form, following refinement into lignocellulosic fibers, a golden to medium brown partially digested lignocellulosic fiber product;

b) adding, prior to or during partial digestion and/or refinement of said lignocellulosic fiber precursors, from 8 weight percent to about 20 weight percent of a normally solid novolac resin, said weight percents of said novolac resin based on dry wood solids weight, to form novolac-containing partially digested lignocellulosic fibers; adding a non-fugitive teritary binder comprising one or more hydrophobic substances such that the surface of said fiber is rendered water repellent but water vapor transmissive;

c) adding hexamethylenetetramine to said novolac-containing partially digested lignocellulosic fibers in an amount of from about 8% by weight to about 30% by weight relative to the weight of the sum of novolac resin solids and any other phenol/formaldehyde resin solids to form a curable fiber product;

d) curing said curable fiber product under heat and pressure to form a cured product having a density of about 800 $kg/m^3$ or more;

e) optionally treating said cured product with a non-fugitive tertiary binder comprising one or more hydrophobic substances such that the surface of said product is rendered water repellant but water vapor transmissive.

25. The product of claim 24 wherein said tertiary binder comprises one or more organosiloxane resins.

26. The product of claim 24 wherein said tertiary binder further comprises an acrylic resin.

* * * * *